United States Patent
Kim (10) Patent No.: US 12,475,669 B2
(45) Date of Patent: Nov. 18, 2025

(54) METHOD AND APPARATUS WITH NEURAL NETWORK OPERATION FOR DATA NORMALIZATION

(71) Applicant: SAMSUNG ELECTRONICS CO., LTD., Suwon-si (KR)

(72) Inventor: Minkyu Kim, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 1021 days.

(21) Appl. No.: 17/241,391

(22) Filed: Apr. 27, 2021

(65) Prior Publication Data
US 2022/0114420 A1    Apr. 14, 2022

(30) Foreign Application Priority Data
Oct. 13, 2020 (KR) .................. 10-2020-0131765

(51) Int. Cl.
| | |
|---|---|
| G06V 10/22 | (2022.01) |
| G06F 18/21 | (2023.01) |
| G06F 18/24 | (2023.01) |
| G06N 3/045 | (2023.01) |
| G06V 10/32 | (2022.01) |

(52) U.S. Cl.
CPC ............. *G06V 10/22* (2022.01); *G06F 18/21* (2023.01); *G06F 18/24* (2023.01); *G06N 3/045* (2023.01); *G06V 10/32* (2022.01)

(58) Field of Classification Search
CPC ...... G06V 10/22; G06V 10/32; G06V 10/764; G06V 10/82; G06F 18/21; G06F 18/24; G06N 3/045; G06N 3/08; G06N 3/063
See application file for complete search history.

(56) References Cited

U.S. PATENT DOCUMENTS

| | | |
|---|---|---|
| 2016/0225169 A1 | 8/2016 | Bippus et al. |
| 2018/0096457 A1* | 4/2018 | Savvides ............... G06V 10/764 |
| 2019/0096064 A1* | 3/2019 | Yang ....................... G06T 11/60 |
| 2019/0102044 A1 | 4/2019 | Wang et al. |
| 2019/0325605 A1* | 10/2019 | Ye ........................ G06F 18/2431 |
| 2020/0012942 A1 | 1/2020 | Ioffe et al. |
| 2020/0344625 A1* | 10/2020 | Xin ........................ H04L 43/062 |

(Continued)

FOREIGN PATENT DOCUMENTS

| | | |
|---|---|---|
| JP | 2018-136642 A | 8/2018 |
| KR | 10-2013-0117624 A | 10/2013 |

(Continued)

OTHER PUBLICATIONS

Ba, Jimmy Lei, Jamie Ryan Kiros, and Geoffrey E. Hinton. "Layer normalization." *arXiv preprint arXiv:*1607.06450 (2016) (14 pages in English).

(Continued)

*Primary Examiner* — Jennifer N Welch
*Assistant Examiner* — Amy P Hoang
(74) *Attorney, Agent, or Firm* — NSIP Law (57) ABSTRACT

A processor-implemented neural network operation method includes: receiving a feature map on which a neural network operation is to be performed; selecting a predetermined area from the feature map; generating a normalization parameter based on the predetermined area; and performing the neural network operation based on the normalization parameter.

16 Claims, 7 Drawing Sheets

(56) References Cited

U.S. PATENT DOCUMENTS

| | | | | |
|---|---|---|---|---|
| 2021/0158088 A1* | 5/2021 | Shao | ............... | G06N 5/01 |
| 2021/0326637 A1* | 10/2021 | Chen | ............... | G06F 18/214 |
| 2021/0327135 A1* | 10/2021 | Borovikov | ............ | G06F 18/214 |

FOREIGN PATENT DOCUMENTS

| | | |
|---|---|---|
| KR | 10-1491461 B1 | 2/2015 |
| KR | 10-1677972 B1 | 11/2016 |
| KR | 10-1721655 B1 | 3/2017 |
| KR | 10-2017-0096088 A | 8/2017 |
| KR | 10-1987618 B1 | 6/2019 |
| KR | 10-2020-0072714 A | 6/2020 |

OTHER PUBLICATIONS

Ioffe, Sergey, and Christian Szegedy. "Batch normalization: Accelerating deep network training by reducing internal covariate shift." *International conference on machine learning.* PMLR, 2015 (11 pages in English).

* cited by examiner

METHOD AND APPARATUS WITH NEURAL NETWORK OPERATION FOR DATA NORMALIZATION

CROSS-REFERENCE TO RELATED APPLICATIONS

This application claims the benefit under 35 USC § 119(a) of Korean Patent Application No. 10-2020-0131765 filed on Oct. 13, 2020, in the Korean Intellectual Property Office, the entire disclosure of which is incorporated herein by reference for all purposes.

BACKGROUND

1. Field

The following description relates to a method and apparatus with a neural network operation.

2. Description of Related Art

Data normalization may limit the range of data to one desired by a user. For example, in the case of image data, pixel information may have values between 0 and 255, and dividing by 255 produces values between 0 and 1.

Data normalization on input data may be performed because gradient vanishing/exploding may occur as data are continuously accumulated during the training process.

Deep learning may use a number of data normalization methods, one of which is batch normalization. Batch normalization is a method of performing normalization by calculating the mean and variance values of features on a batch basis. Batch normalization may be performed under the assumption that if the batch size is sufficiently large, the calculated mean and variance may represent the mean and the variance of the entire data set.

In addition, the normalization methods include layer normalization, instance normalization, and group normalization. Layer normalization is a method of normalizing channels and the entire image, and instance normalization is a method of performing channel-wise normalization. Group normalization is a method of performing normalization by dividing each channel into N groups.

In an existing normalization method such as batch normalization, it is common to perform normalization after calculating the mean and variance for each feature in mini-batch data. However, the existing batch normalization method may be greatly affected by outliers included in a data set.

Although there are weights and biases for the input data, the existing batch normalization method is inefficient in calculating the mean and standard deviation for the entire batch or the overall part such as features and channels.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

In one general aspect, a processor-implemented neural network operation method includes: receiving a feature map on which a neural network operation is to be performed; selecting a predetermined area from the feature map; generating a normalization parameter based on the predetermined area; and performing the neural network operation based on the normalization parameter.

The selecting may include: recognizing an object included in the feature map; and selecting the predetermined area to include the object.

The generating may include generating the normalization parameter based on position information of the predetermined area.

The generating of the normalization parameter based on the position information of the predetermined area may include generating a parameter vector corresponding to the feature map based on the position information.

The generating of the parameter vector may include: assigning a parameter value for performing normalization to a component, of the parameter vector, corresponding to the predetermined area; and assigning a parameter value for skipping normalization to a component, of the parameter vector, corresponding to an area of the feature map excluding the predetermined area.

The area of the feature map excluding the predetermined area may be a remaining area of the feature map except for the predetermined area.

The generating of the normalization parameter based on the position information of the predetermined area may include determining the normalization parameter based on any one or any combination of a height, a width, a channel, and a batch of the feature map.

The method may include: performing a first neural network operation on the feature map, wherein the performing of the neural network operation based on the normalization parameter may include performing a second neural network operation on the feature map on which the first neural network operation is performed based on the normalization parameter.

The first neural network operation may include either one or both of a convolution operation and an activation operation.

The second neural network operation may include any one or any combination of a pooling operation, a flatten operation, and a fully connected operation.

The performing of the neural network operation based on the normalization parameter may include outputting an image classification score of the object.

A non-transitory computer-readable storage medium may store instructions that, when executed by a processor, configure the processor to perform the method.

In another general aspect, a neural network operation apparatus includes: a receiver configured to receive a feature map on which a neural network operation is to be performed; and a processor configured to select a predetermined area from the feature map, generate a normalization parameter based on the predetermined area, and perform the neural network operation based on the normalization parameter.

For the selecting, the processor may be configured to: recognize an object included in the feature map, and select the predetermined area to include the object.

For the generating, the processor may be configured to generate the normalization parameter based on position information of the predetermined area.

For the generating of the normalization parameter based on the position information of the predetermined area, the processor may be configured to generate a parameter vector corresponding to the feature map based on the position information.

For generating of the parameter vector, the processor may be configured to: assign a parameter value for performing normalization to a component, of the parameter vector, corresponding to the predetermined area, and assign a parameter value for skipping normalization to a component, of the parameter vector, corresponding to an area of the feature map excluding the predetermined area.

For the generating of the normalization parameter based on the position information of the predetermined area, the processor may be configured to determine the normalization parameter based on any one or any combination of a height, a width, a channel, and a batch of the feature map.

The processor may be configured to: perform a first neural network operation on the feature map, and, for the performing of the neural network operation based on the normalization parameter, perform a second neural network operation on the feature map on which the first neural network operation is performed based on the normalization parameter.

The first neural network operation may include either one or both of a convolution operation and an activation operation.

The second neural network operation may include any one or any combination of a pooling operation, a flatten operation, and a fully connected operation.

In another general aspect, a processor-implemented neural network operation method includes: performing, based on a feature map corresponding to an image including an object, a first neural network operation including either one or both of a convolution operation and an activation operation; performing selective normalization on an output of the first neural network operation by normalizing a portion of the output corresponding to an area including the object and excluding from normalization a portion of the output corresponding to an area excluding the object; and generating an image classification result by performing one or more second neural network operations on the normalized output.

The normalizing of the portion of the output corresponding to the area including the object may be based on a parameter value determined for performing normalization; and the excluding from normalization of the portion of the output corresponding to an area excluding the object may be based on a parameter value for skipping normalization.

Other features and aspects will be apparent from the following detailed description, the drawings, and the claims.

Throughout the drawings and the detailed description, unless otherwise described or provided, the same drawing reference numerals will be understood to refer to the same elements, features, and structures. The drawings may not be to scale, and the relative size, proportions, and depiction of elements in the drawings may be exaggerated for clarity, illustration, and convenience.

DETAILED DESCRIPTION

The following detailed structural or functional description is provided as an example only and various alterations and modifications may be made to the examples. Here, the examples are not construed as limited to the disclosure and should be understood to include all changes, equivalents, and replacements within the idea and the technical scope of the disclosure.

The following detailed description is provided to assist the reader in gaining a comprehensive understanding of the methods, apparatuses, and/or systems described herein. However, various changes, modifications, and equivalents of the methods, apparatuses, and/or systems described herein will be apparent after an understanding of the disclosure of this application. For example, the sequences of operations described herein are merely examples, and are not limited to those set forth herein, but may be changed as will be apparent after an understanding of the disclosure of this application, with the exception of operations necessarily occurring in a certain order. Also, descriptions of features that are known in the art, after an understanding of the disclosure of this application, may be omitted for increased clarity and conciseness.

Although terms of "first" or "second" are used herein to describe various members, components, regions, layers, or sections, these members, components, regions, layers, or sections are not to be limited by these terms. Rather, these terms are only used to distinguish one member, component, region, layer, or section from another member, component, region, layer, or section. Thus, a first member, component, region, layer, or section referred to in examples described herein may also be referred to as a second member, component, region, layer, or section without departing from the teachings of the examples.

Throughout the specification, when an element, such as a layer, region, or substrate, is described as being "on," "connected to," or "coupled to" another element, it may be directly "on," "connected to," or "coupled to" the other element, or there may be one or more other elements intervening therebetween. In contrast, when an element is described as being "directly on," "directly connected to," or "directly coupled to" another element, there can be no other elements intervening therebetween. Likewise, expressions, for example, "between" and "immediately between" and "adjacent to" and "immediately adjacent to" may also be construed as described in the foregoing.

The terminology used herein is for the purpose of describing particular examples only and is not to be limiting of the present disclosure. As used herein, the singular forms "a", "an", and "the" are intended to include the plural forms as well, unless the context clearly indicates otherwise. As used herein, the term "and/or" includes any one and any combination of any two or more of the associated listed items. As used herein, the terms "include," "comprise," and "have" specify the presence of stated features, integers, steps, operations, elements, components, numbers, and/or combinations thereof, but do not preclude the presence or addition of one or more other features, integers, steps, operations, elements, components, numbers, and/or combinations thereof. The use of the term "may" herein with respect to an example or embodiment (for example, as to what an example or embodiment may include or implement) means that at least one example or embodiment exists where such a feature is included or implemented, while all examples are not limited thereto.

Unless otherwise defined, all terms, including technical and scientific terms, used herein have the same meaning as commonly understood by one of ordinary skill in the art to which this disclosure pertains after and understanding of the present disclosure. Terms, such as those defined in commonly used dictionaries, are to be interpreted as having a meaning that is consistent with their meaning in the context of the relevant art and the present disclosure, and are not to be interpreted in an idealized or overly formal sense unless expressly so defined herein.

Hereinafter, examples will be described in detail with reference to the accompanying drawings. When describing the examples with reference to the accompanying drawings, like reference numerals refer to like components and a repeated description related thereto will be omitted.

Figure 1:
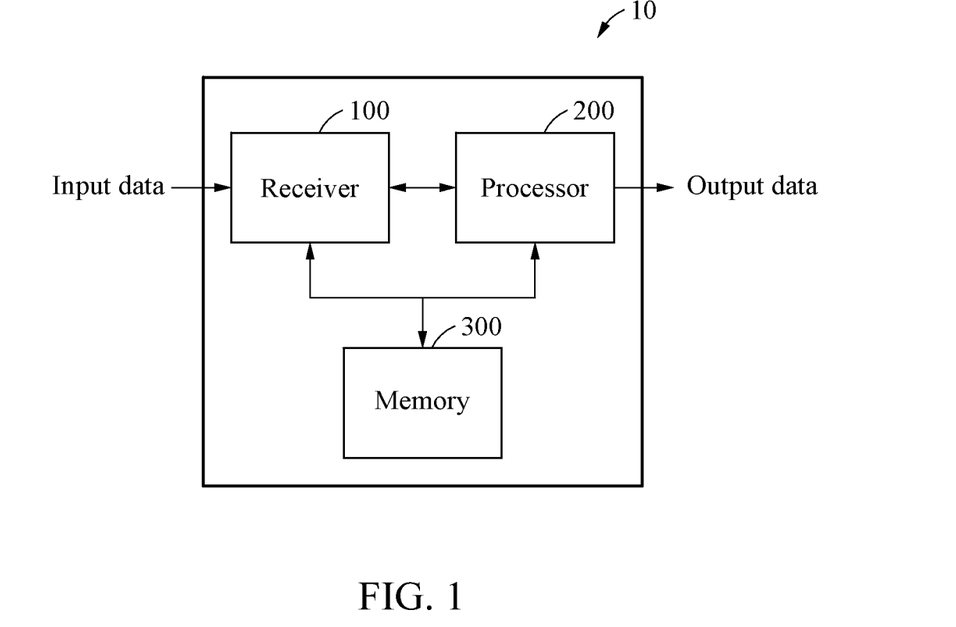
FIG. 1 illustrates an example of a neural network operation apparatus.

FIG. 1 illustrates an example of a neural network operation apparatus.

Referring to FIG. 1, a neural network operation apparatus 10 may perform a neural network operation. The neural network operation apparatus 10 may generate output data by performing a neural network operation based on input data.

The neural network may include a statistical training algorithm in machine learning and cognitive science. The neural network may refer to a model that has an ability to solve a problem, where nodes forming the network through synaptic combinations change a connection strength of synapses through training.

The neural network may include a deep neural network (DNN). The neural network may include a convolutional neural network (CNN), a recurrent neural network (RNN), a perceptron, a feed forward (FF), a radial basis network (RBF), a deep feed forward (DFF), a long short-term memory (LSTM), a gated recurrent unit (GRU), an auto encoder (AE), a variational auto encoder (VAE), a denoising auto encoder (DAE), a sparse auto encoder (SAE), a Markov chain (MC), a Hopfield network (HN), a Boltzmann machine (BM), a restricted Boltzmann machine (RBM), a deep belief network (DBN), a deep convolutional network (DCN), a deconvolutional network (DN), a deep convolutional inverse graphics network (DCIGN), a generative adversarial network (GAN), a liquid state machine (LSM), an extreme learning machine (ELM), an echo state network (ESN), a deep residual network (DRN), a differentiable neural computer (DNC), a neural turning machine (NTM), a capsule network (CN), a Kohonen network (KN), and an attention network (AN).

The neural network operation may include a convolution operation, an activation operation, a normalization operation, a pooling operation, a flatten operation, and/or a fully connected operation. Non-limiting examples of the operations will be described in detail with reference to FIG. 8.

The neural network operation apparatus 10 of one or more embodiments may perform a neural network operation more effectively by selectively normalizing input data.

The neural network operation apparatus 10 may include a receiver 100 and a processor 200. The neural network operation apparatus 10 may further include a memory 300. The neural network operation apparatus 10 may be, for example, an electronic device such as a computing device (such as a smartphone, a personal computer (PC), a tablet PC, and/or a laptop), a wearable device (such as a smart watch, and/or smart eyeglasses), a home appliance (such as a smart speaker, a smart TV, and/or a smart refrigerator), and/or other devices such as a smart vehicle, a smart kiosk, and/or an Internet of things (IoT) device.

The receiver 100 may receive an image or a feature map on which a neural network operation is to be performed. The receiver 100 may include a receiving interface. The receiver 100 may receive the image or the feature map through an external input or the memory 300. The receiver 100 may output the received image or feature map to the processor 200.

The processor 200 may process data stored in the memory 300. The processor 200 may execute a computer-readable code (for example, software) stored in the memory 300 and instructions triggered by the processor 200.

The "processor 200" may be a hardware data processing device including a circuit having a physical structure to perform desired operations. For example, the desired operations may include instructions or codes included in a program.

For example, the data processing device may be, or include, a microprocessor, a central processing unit (CPU), a processor core, a multi-core processor, a multiprocessor, an application-specific integrated circuit (ASIC), and/or a field-programmable gate array (FPGA).

The processor 200 may select a predetermined area from the feature map. The processor 200 may recognize an object included in the feature map. The processor 200 may select a predetermined area including the recognized object. Non-limiting examples of the process of selecting a predetermined area by the processor 200 will be described in detail with reference to FIGS. 5 and 6.

The processor 200 may generate a normalization parameter based on the predetermined area. The processor 200 may generate the normalization parameter based on position information of the predetermined area.

The position information of the predetermined area may include position information about a pixel included in the predetermined area within the image or the feature map. For example, the position information may include a channel including the pixel, a height value of the pixel, and a width value of the pixel.

The processor 200 may generate a parameter vector corresponding to the feature map based on the position information described above. In other words, the normalization parameter may include a parameter vector.

The processor 200 may assign a parameter value for performing normalization to a component, of the parameter vector, corresponding to the predetermined area. The processor 200 may assign a parameter value for skipping normalization to a component, of the parameter vector, corresponding to an area except for the predetermined area.

For example, the processor 200 may assign "1" as the parameter value for performing normalization and "0" as the parameter value for skipping normalization.

The processor 200 may determine a normalization parameter according to a height, width, channel or batch of the feature map. In other words, the normalization parameter may include a parameter value according to the height, width, channel or batch.

The processor 200 may perform a neural network operation based on the normalization parameter.

The processor 200 may perform a first neural network operation on the feature map. The processor 200 may perform a second neural network operation on the feature map on which the first neural network operation is performed based on the generated normalization parameter.

The first neural network operation may include a convolution operation or an activation operation. The second neural network operation may include a pooling operation, a flatten operation, or a fully connected operation.

The memory 300 may store instructions (or programs) executable by the processor. For example, the instructions may include instructions to perform an operation of the processor and/or an operation of each element of the processor.

The memory 300 may be implemented as a volatile memory device or a non-volatile memory device.

The volatile memory device may be implemented as a dynamic random access memory (DRAM), a static random access memory (SRAM), a thyristor RAM (T-RAM), a zero capacitor RAM (Z-RAM), and/or a Twin Transistor RAM (TTRAM).

The non-volatile memory device may be implemented as an electrically erasable programmable read-only memory (EEPROM), a flash memory, a magnetic RAM (MRAM), a spin-transfer torque (STT)-MRAM, a conductive bridging RAM (CBRAM), a ferroelectric RAM (FeRAM), a phase change RAM (PRAM), a resistive RAM (RRAM), a nanotube RRAM, a polymer RAM (PoRAM), a nano floating gate Memory (NFGM), a holographic memory, a molecular electronic memory device), and/or an insulator resistance change memory.

Hereinafter, non-limiting examples of the process of performing selective normalization by the processor 200 will be described in detail with reference to FIGS. 2 to 7.

Figure 2:
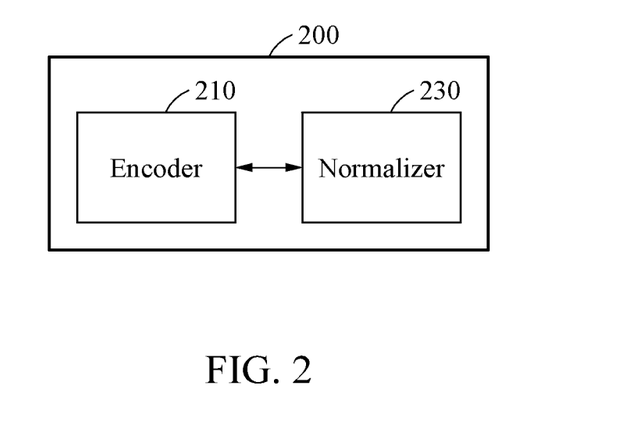
FIG. 2 illustrates an example of a processor.
Figure 3:
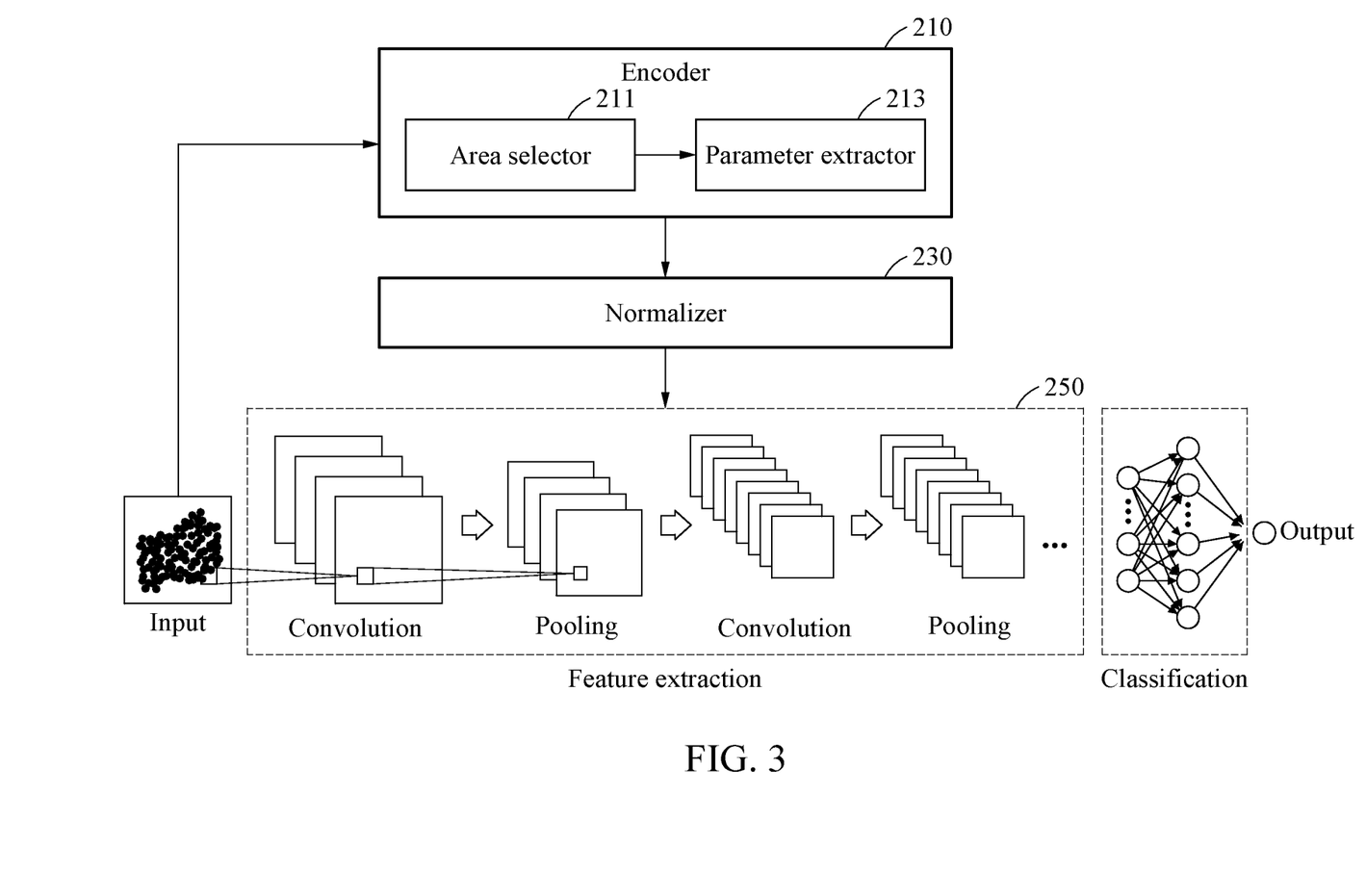
FIG. 3 illustrates an example of an operation of a processor.
Figure 4:
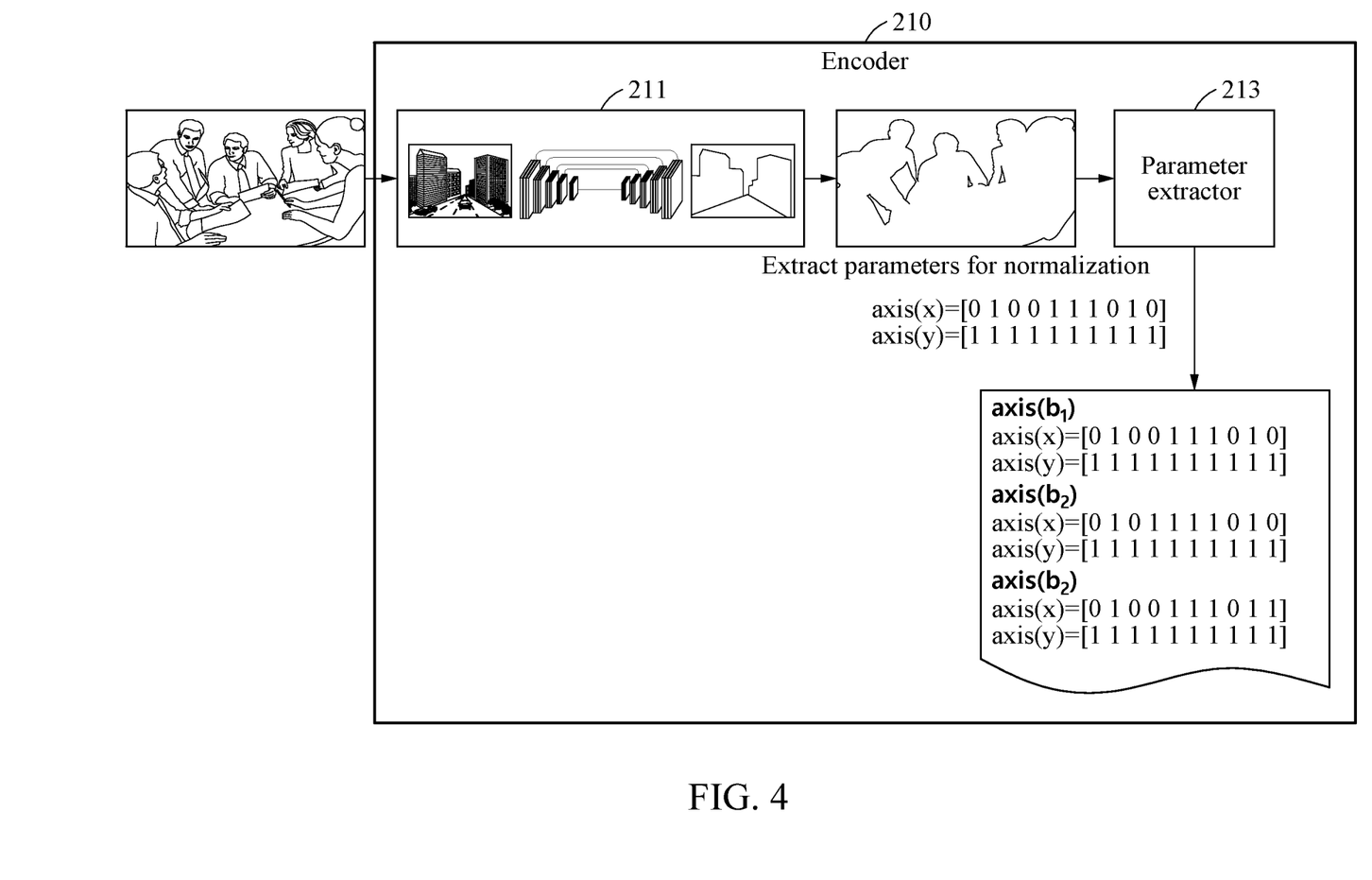
FIG. 4 illustrates an example of an operation of an encoder.

FIG. 2 illustrates an example of a processor (for example, a processor shown in FIG. 1), FIG. 3 illustrates an example of an operation of a processor (for example, the processor shown in FIG. 1), and FIG. 4 illustrates an example of an operation of an encoder (for example, an encoder shown in FIG. 2).

Referring to FIGS. 2 and 3, the processor 200 may include an encoder 210 and a normalizer 230. The encoder 210 may include an area selector 211 and a parameter extractor 213.

The encoder 210 may perform data processing for performing normalization by encoding input data (for example, an image or feature map).

The encoder 210 may perform encoding. Encoding may refer to processing or a processing method of converting the form or format of information into another form or format for standardization, security, processing rate improvement, and/or storage space saving. An encoder may refer to a device or circuit configured to perform encoding.

A decoder may perform an operation opposite to that of the encoder. Encoding may refer to converting an object into a form suitable for processing with a particular purpose, whereas decoding may refer to converting an encoded object into its original form.

For example, when performing compression since a movie is formed of extremely numerous scenes, the object may be data of pixels in the movie, and the purpose may be compression. In this case, encoding may correspond to compression, and decoding may correspond to conversion into original pixel data by decompressing the compressed file.

The encoder 210 may generate a normalization parameter by performing encoding based on the input data (for example, the image or feature map).

The area selector 211 may select a predetermined area to be normalized from the feature map. The area selector 211 may recognize an object included in the feature map and select a predetermined area including the object based on the recognized object.

The area selector 211 may recognize objects included in the feature map, and classify the recognized objects. The area selector 211 may select the predetermined area by segmenting the feature map using image segmentation.

For example, the area selector 211 may segment a digital image (for example the input data) into pixel sets in computer vision using semantic segmentation. The area selector 211 may find a boundary of a predetermined object in the image through segmentation of the image, and select an area to be normalized as the predetermined area based on the boundary.

The parameter extractor 213 may generate a normalization parameter based on the selected predetermined area. The parameter extractor 213 may extract the normalization parameter based on position information of the predetermined area. The parameter extractor 213 may extract the normalization parameter in the form of a parameter vector. The parameter vector may have, as a component, a parameter value that determines whether to perform normalization on the input feature map. Non-limiting examples of the normalization parameter extracted by the parameter extractor 213 will be described in detail with reference to FIG. 7.

The normalizer 230 may perform selective normalization on the feature map based on the extracted normalization parameter.

The normalization parameter may be used for the feature extraction 250. For example, the feature extraction may include a first neural network operation including either one or both of a convolution operation and an activation operation, and a second neural network operation including any one or any combination of a pooling operation, a flatten operation, and a fully connected operation. The first neural network operation may be performed on the feature map, and the second neural network operation may be performed on the feature map on which the first neural network operation is performed based on the normalization parameter.

Figure 5:
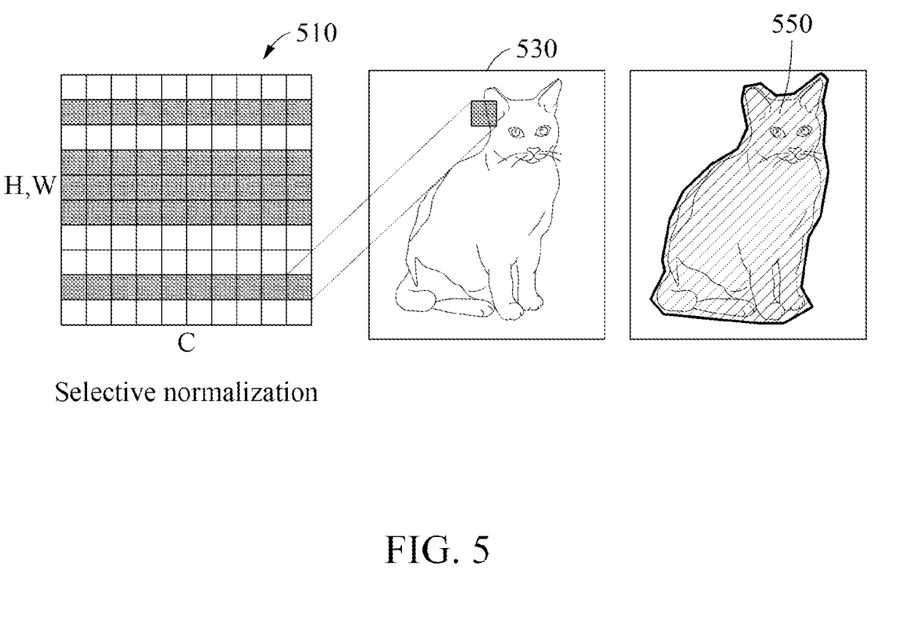
FIG. 5 illustrates an example of a selective normalization operation.
Figure 6:
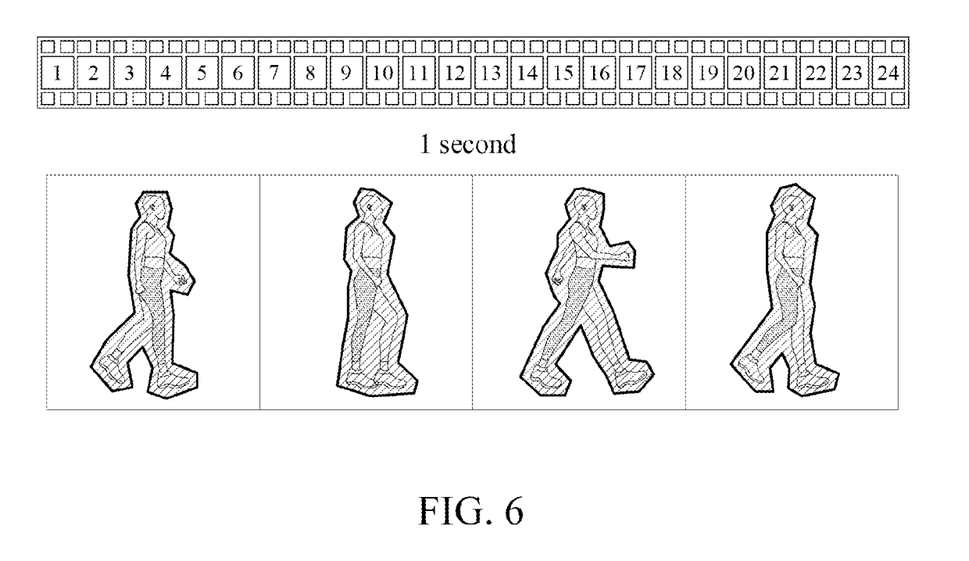
FIG. 6 illustrates an example of normalization for multiple frames.
Figure 7:
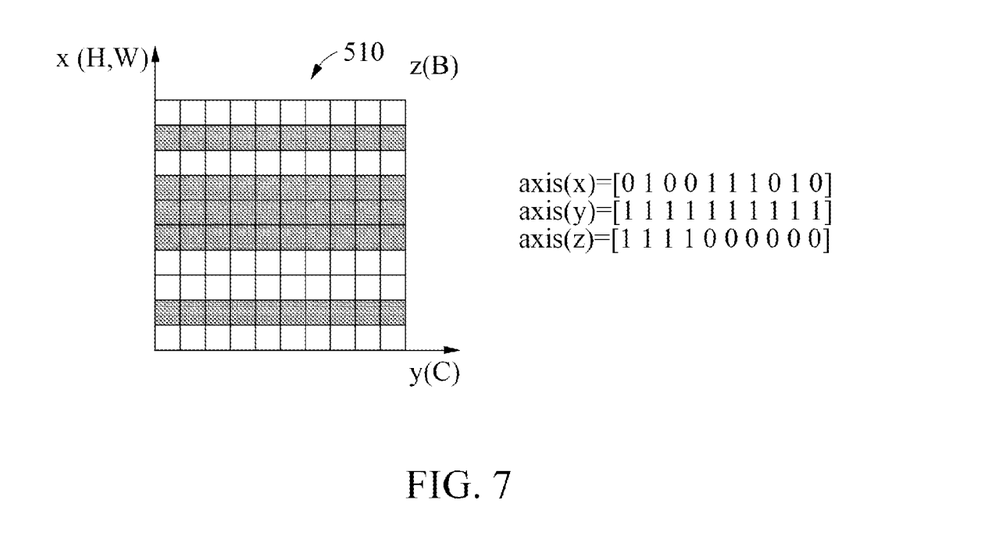
FIG. 7 illustrates an example of a normalization parameter.

FIG. 5 illustrates an example of a selective normalization operation, FIG. 6 illustrates an example of normalization for multiple frames, and FIG. 7 illustrates an example of a normalization parameter.

Referring to FIGS. 5 to 7, the processor 200 of one or more embodiments may select a predetermined area from a feature map and generate a normalization parameter based on the predetermined area, thereby performing normalization only on a partial area of the feature map.

The example of FIG. 5 shows a predetermined area 550 selected from a feature map 530, and a normalization parameter 510 generated based on the predetermined area 550.

The area selector 211 may recognize an object from the feature map 530. The example of FIG. 5 shows a case in which the object is a cat. In the example of FIG. 5, the area selector 231 may select the predetermined area 550 including the object which is a cat. The area selector 211 may segment the area including the object as the predetermined area 550 through image segmentation.

The area selector 211 may select an area to be normalized based on 2-D tensor information. The area selector 211 may more efficiently perform area selection on successive images as shown in the example of FIG. 6. For example, there may be video data including an image of 24 frames per 1 second. In this example, since an area that actually changes on the screen may not be large, by selecting only an area that changes in a feature map corresponding to each frame as the predetermined area 550, the efficiency of area selection may increase.

The parameter extractor 213 may generate the normalization parameter 510 based on the predetermined area 550. The parameter extractor 213 may generate a parameter vector by assigning different parameter values to an area to be normalized and an area not to be normalized.

As shown in the example of FIG. 7, the normalization parameter may be expressed in the form of a three-dimensional vector or three one-dimensional vectors. In the normalization parameter, the x axis may indicate the height and width of the feature map, the y axis may indicate a channel, and the z axis may indicate a batch.

The parameter extractor 213 may assign "1" to a position where normalization is to be performed and "0" to a position where normalization is to be skipped. In the example of FIG. 7, the normalizer 230 may not normalize an area of the feature map where the component of the parameter vector corresponds to "0", and may perform normalization only on an area of the feature map where the component of the parameter vector corresponds to "1".

The normalizer 230 may perform selective normalization on the feature map 530 based on the normalization parameter 510. The normalizer 230 of one or more embodiments may perform selective normalization, thereby preventing gradient vanishing or gradient exploding.

There may occur a phenomenon in which the distribution of input data is changed for each layer or activation step of a neural network. To prevent this phenomenon, the normalizer 230 may normalize the distribution of input data of each layer to a mean of "0" and a standard deviation of "1". The normalizer 230 may normalize only a predetermined area by designating the range of the area in the input feature map.

Normalization performed by the normalizer 230 may include min-max normalization and Z-score normalization. The min-max normalization may be a method that converts the values of a feature map to a minimum value of "0" and a maximum value of "1", and normalizes the other values to values between "0" and "1".

Z-score normalization may be a normalization method that normalizes a value of a feature map to "0" when the value matches a mean, to a negative value when a value of the feature map is less than the mean, and to a positive value when a value of the feature map is greater than the mean. In this case, the calculated positive and negative values may be determined by a standard deviation of the values of the feature map. If the standard deviation of the values of the feature map is relatively great (if the values are widely distributed), the normalized value may be relatively close to "0".

The normalizer 230 of one or more embodiments may perform normalization only on an area that actually changes based on the normalization parameter, thereby reducing the computational complexity and solving issues caused by outliers.

Figure 8:
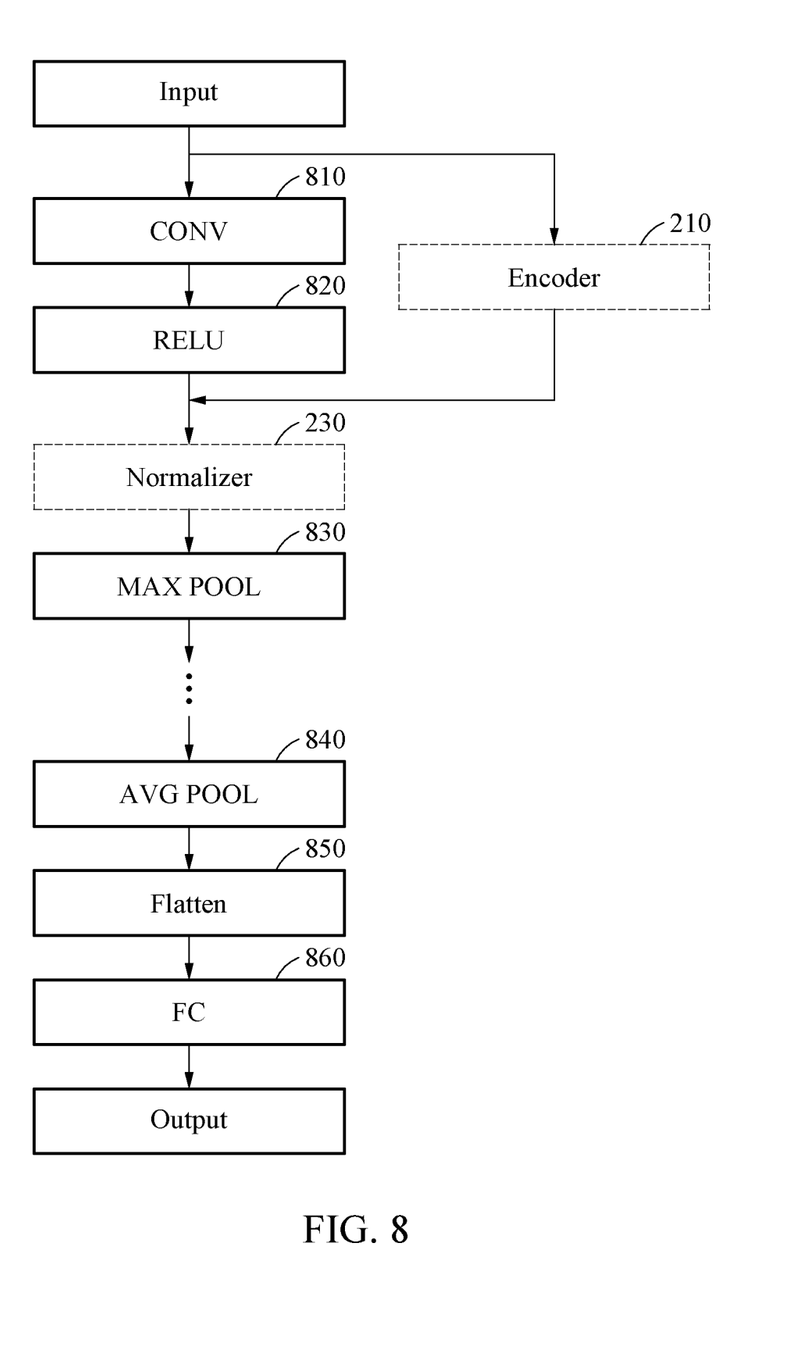
FIG. 8 illustrates an example of a neural network operation to which a neural network operation apparatus is applied.

FIG. 8 illustrates an example of a neural network operation to which a neural network operation apparatus (for example, the neural network operation apparatus of FIG. 1) is applied.

Referring to FIG. 8, the processor 200 may perform a neural network operation based on a normalization parameter. The processor 200 may implement the encoder 210 and the normalizer 230 in the middle of a predetermined neural network operation, thereby improving the efficiency of the neural network operation.

The processor 200 may perform a first neural network operation on a feature map, and perform a second neural network operation on the feature map on which the first neural network operation is performed based on a normalization parameter.

The encoder 210 may extract the normalization parameter by encoding the input feature map. The normalizer 230 may perform selective normalization on a result of performing the first neural network operation based on the normalization parameter.

The first neural network operation may include a convolution operation 810 or an activation operation 820. The convolution operation 810 may extract features of the input data through a convolution operation between the input feature map and a filter or kernel which is a set of weights.

The activation operation 820 may refer to an operation that compares a value, obtained by multiplying an input signal by a weight in the perceptron algorithm, to a threshold, and returns "1" if the value is greater than the threshold and "0" if the value is less than the threshold.

In this case, a function configured to output "0" or "1" through a comparison to the threshold may be referred to as an activation function. The activation function may be a function that converts the sum of input signals into an output signal. In addition, the activation function may determine whether the sum of the input signals causes activation.

The activation operation 820 may include a nonlinear activation operation. The nonlinear activation operation may include rectified linear unit (ReLU), Leaky ReLU, parametric ReLU, Softmax, Sigmoid, Tan h, exponential linear unit (ELU), and SoftPlus operations.

The second neural network operation may include pooling operations 830 and 840, a flatten operation 850, and/or a fully connected operation 860.

A pooling operation may be an operation that performs sub-sampling on features extracted through a convolution operation. The pooling operation may include a max pooling operation 830 for extracting a maximum value, and an average pooling operation 840 for extracting an average value.

The flatten operation 850 may be an operation for converting a two-dimensional feature map into one-dimensional data to transmit a result of the pooling operation to a fully connected operation.

The fully connected operation 860 may be implemented by fully connected layers. The fully connected layers may be layers in which each node in a layer is connected to all nodes in the following layer. The fully connected layers may be referred to as output layers, and may indicate or determine, as an output, class scores in a classification problem.

Figure 9:
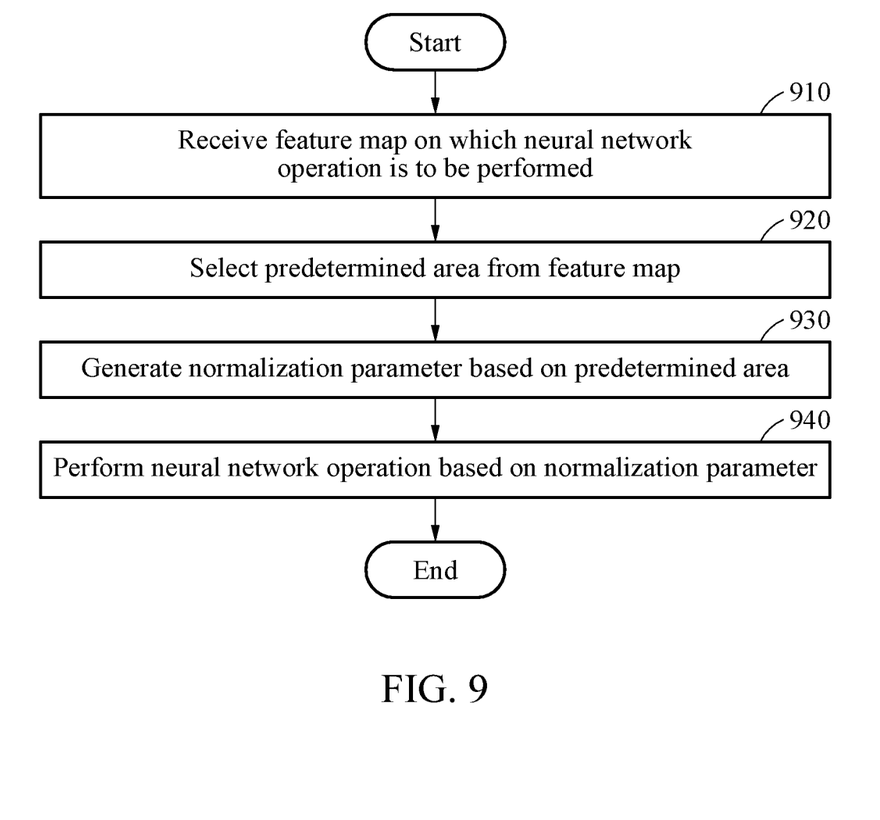
FIG. 9 illustrates an example of a flow of operation of a neural network operation apparatus.

FIG. 9 illustrates an example of a flow of operation of a neural network operation apparatus (for example, the neural network operation apparatus of FIG. 1).

Referring to FIG. 9, in operation 910, the receiver 100 may receive a feature map on which a neural network operation is to be performed.

In operation 920, the processor 200 may select a predetermined area from the feature map. The processor 200 may recognize an object included in the feature map and select a predetermined area including the object.

In operation 930, the processor 200 may generate a normalization parameter based on the predetermined area. The processor 200 may generate the normalization parameter based on position information of the predetermined area. The processor 200 may determine the normalization parameter according to a height, width, channel or batch of the feature map.

The processor 200 may generate a parameter vector corresponding to the feature map based on the position information. The processor 200 may assign a parameter value for performing normalization to a component, of the parameter vector, corresponding to the predetermined area. The processor 200 may assign a parameter value for skipping normalization to a component, of the parameter vector, corresponding to an area except for the predetermined area.

For example, the processor 200 may assign "1" as the parameter value for performing normalization and "0" as the parameter value for skipping normalization.

In operation 940, the processor 200 may perform a neural network operation based on the generated normalization parameter. The processor 200 may perform a first neural network operation on the received feature map. The processor 200 may perform a second neural network operation on the feature map on which the first neural network operation is performed based on the normalization parameter.

The first neural network operation may include a convolution operation or an activation operation. The second neural network operation may include a pooling operation, a flatten operation, and/or a fully connected operation.

The neural network operation apparatuses, receivers, processors, memories, encoders, normalizers, area selectors, parameter extractors, neural network operation apparatus 10, receiver 100, processor 200, memory 300, processor 200, encoder 210, normalizer 230, area selector 211, parameter extractor 213, and other apparatuses, devices, units, modules, and components described herein with respect to FIGS. 1-9 are implemented by or representative of hardware components. Examples of hardware components that may be used to perform the operations described in this application where appropriate include controllers, sensors, generators, drivers, memories, comparators, arithmetic logic units, adders, subtractors, multipliers, dividers, integrators, and any other electronic components configured to perform the operations described in this application. In other examples, one or more of the hardware components that perform the operations described in this application are implemented by computing hardware, for example, by one or more processors or computers. A processor or computer may be implemented by one or more processing elements, such as an array of logic gates, a controller and an arithmetic logic unit, a digital signal processor, a microcomputer, a programmable logic controller, a field-programmable gate array, a programmable logic array, a microprocessor, or any other device or combination of devices that is configured to respond to and execute instructions in a defined manner to achieve a desired result. In one example, a processor or computer includes, or is connected to, one or more memories storing instructions or software that are executed by the processor or computer. Hardware components implemented by a processor or computer may execute instructions or software, such as an operating system (OS) and one or more software applications that run on the OS, to perform the operations described in this application. The hardware components may also access, manipulate, process, create, and store data in response to execution of the instructions or software. For simplicity, the singular term "processor" or "computer" may be used in the description of the examples described in this application, but in other examples multiple processors or computers may be used, or a processor or computer may include multiple processing elements, or multiple types of processing elements, or both. For example, a single hardware component or two or more hardware components may be implemented by a single processor, or two or more processors, or a processor and a controller. One or more hardware components may be implemented by one or more processors, or a processor and a controller, and one or more other hardware components may be implemented by one or more other processors, or another processor and another controller. One or more processors, or a processor and a controller, may implement a single hardware component, or two or more hardware components. A hardware component may have any one or more of different processing configurations, examples of which include a single processor, independent processors, parallel processors, single-instruction single-data (SISD) multiprocessing, single-instruction multiple-data (SIMD) multiprocessing, multiple-instruction single-data (MISD) multiprocessing, and multiple-instruction multiple-data (MIMD) multiprocessing.

The methods illustrated in FIGS. 1-9 that perform the operations described in this application are performed by computing hardware, for example, by one or more processors or computers, implemented as described above executing instructions or software to perform the operations described in this application that are performed by the methods. For example, a single operation or two or more operations may be performed by a single processor, or two or more processors, or a processor and a controller. One or more operations may be performed by one or more processors, or a processor and a controller, and one or more other operations may be performed by one or more other processors, or another processor and another controller. One or more processors, or a processor and a controller, may perform a single operation, or two or more operations.

Instructions or software to control computing hardware, for example, one or more processors or computers, to implement the hardware components and perform the methods as described above may be written as computer programs, code segments, instructions or any combination thereof, for individually or collectively instructing or configuring the one or more processors or computers to operate as a machine or special-purpose computer to perform the operations that are performed by the hardware components and the methods as described above. In one example, the instructions or software include machine code that is directly executed by the one or more processors or computers, such as machine code produced by a compiler. In another example, the instructions or software includes higher-level code that is executed by the one or more processors or computer using an interpreter. The instructions or software may be written using any programming language based on the block diagrams and the flow charts illustrated in the drawings and the corresponding descriptions in the specification, which disclose algorithms for performing the operations that are performed by the hardware components and the methods as described above.

The instructions or software to control computing hardware, for example, one or more processors or computers, to implement the hardware components and perform the methods as described above, and any associated data, data files, and data structures, may be recorded, stored, or fixed in or on one or more non-transitory computer-readable storage media. Examples of a non-transitory computer-readable storage medium include read-only memory (ROM), random-access programmable read only memory (PROM), electrically erasable programmable read-only memory (EEPROM), random-access memory (RAM), dynamic random access memory (DRAM), static random access memory (SRAM), flash memory, non-volatile memory, CD-ROMs, CD-Rs, CD+Rs, CD-RWs, CD+RWs, DVD-ROMs, DVD-Rs, DVD+Rs, DVD-RWs, DVD+RWs, DVD-RAMs, BD-ROMs, BD-Rs, BD-R LTHs, BD-REs, blue-ray or optical disk storage, hard disk drive (HDD), solid state drive (SSD), flash memory, a card type memory such as multimedia card micro or a card (for example, secure digital (SD) or extreme digital (XD)), magnetic tapes, floppy disks, magneto-optical data storage devices, optical data storage devices, hard disks, solid-state disks, and any other device that is configured to store the instructions or software and any associated data, data files, and data structures in a non-transitory manner and provide the instructions or software and any associated data, data files, and data structures to one or more processors or computers so that the one or more processors or computers can execute the instructions. In one example, the instructions or software and any associated data, data files, and data structures are distributed over network-coupled computer systems so that the instructions and software and any associated data, data files, and data structures are stored, accessed, and executed in a distributed fashion by the one or more processors or computers.

While this disclosure includes specific examples, it will be apparent after an understanding of the disclosure of this application that various changes in form and details may be made in these examples without departing from the spirit and scope of the claims and their equivalents. The examples described herein are to be considered in a descriptive sense only, and not for purposes of limitation. Descriptions of features or aspects in each example are to be considered as being applicable to similar features or aspects in other examples. Suitable results may be achieved if the described techniques are performed in a different order, and/or if components in a described system, architecture, device, or circuit are combined in a different manner, and/or replaced or supplemented by other components or their equivalents.

What is claimed is:

1. A processor-implemented neural network operation method, comprising:
   receiving a feature map on which a neural network operation is to be performed;
   selecting a predetermined area from the feature map;
   performing selective normalization on the feature map based on a normalization parameter generated based on the predetermined area, including selectively normalizing a portion of the feature map corresponding to an area including an object and selectively excluding from normalization a portion of the feature map corresponding to an area excluding the object depending on a value of the normalization parameter, including generating the normalization parameter based on position information of the predetermined area,
   wherein the generating of the normalization parameter based on the position information of the predetermined area comprises generating a parameter vector corresponding to the feature map based on the position information, and
   wherein the generating of the parameter vector comprises:
   assigning a parameter value for performing normalization to a component, of the parameter vector, corresponding to the predetermined area; and
   assigning a parameter value for skipping normalization to a component, of the parameter vector, corresponding to an area of the feature map excluding the predetermined area; and
   performing the neural network operation based on a result of the selective normalization.

2. The method of claim 1, wherein the selecting comprises:
   recognizing the object included in the feature map; and
   selecting the predetermined area to include the object.

3. The method of claim 1, wherein the area of the feature map excluding the predetermined area is a remaining area of the feature map except for the predetermined area.

4. The method of claim 1, wherein the generating of the normalization parameter based on the position information of the predetermined area comprises determining the normalization parameter based on any one or any combination of a height, a width, a channel, and a batch of the feature map.

5. The method of claim 1, further comprising:
   performing a first neural network operation on the feature map,
   wherein the performing of the neural network operation based on the result of the selective normalization comprises performing a second neural network operation on the feature map on which the first neural network operation is performed based on the normalization parameter.

6. The method of claim 5, wherein the first neural network operation comprises either one or both of a convolution operation and an activation operation.

7. The method of claim 6, wherein the second neural network operation comprises any one or any combination of a pooling operation, a flatten operation, and a fully connected operation.

8. The method of claim 1, wherein the performing of the neural network operation based on the result of the selective normalization comprises outputting an image classification score of the object.

9. A non-transitory computer-readable storage medium storing instructions that, when executed by a processor, configure the processor to perform the method of claim 1.

10. A neural network operation apparatus, comprising:
    a receiver configured to receive a feature map on which a neural network operation is to be performed; and
    a processor configured to:
    select a predetermined area from the feature map;
    perform selective normalization on the feature map based on a normalization parameter generated based on the predetermined area, including selectively normalizing a portion of the feature map corresponding to an area including an object and selectively excluding from normalization a portion of the feature map corresponding to an area excluding the object depending on a value of the normalization parameter,
    wherein the processor is configured to generate the normalization parameter based on position information of the predetermined area,
    wherein, for the generating of the normalization parameter based on the position information of the predetermined area, the processor is configured to generate a parameter vector corresponding to the feature map based on the position information, and
    wherein, for generating of the parameter vector, the processor is configured to:
    assign a parameter value for performing normalization to a component, of the parameter vector, corresponding to the predetermined area, and
    assign a parameter value for skipping normalization to a component, of the parameter vector, corresponding to an area of the feature map excluding the predetermined area; and
    perform the neural network operation based on a result of the selective normalization.

11. The apparatus of claim 10, wherein, for the selecting, the processor is configured to:
recognize the object included in the feature map, and select the predetermined area to include the object.

12. The apparatus of claim 10, wherein, for the generating of the normalization parameter based on the position information of the predetermined area, the processor is configured to determine the normalization parameter based on any one or any combination of a height, a width, a channel, and a batch of the feature map.

13. The apparatus of claim 10, wherein the processor is configured to:
perform a first neural network operation on the feature map, and
for the performing of the neural network operation based on the result of the selective normalization, perform a second neural network operation on the feature map on which the first neural network operation is performed based on the normalization parameter.

14. The apparatus of claim 13, wherein the first neural network operation comprises either one or both of a convolution operation and an activation operation.

15. The apparatus of claim 14, wherein the second neural network operation comprises any one or any combination of a pooling operation, a flatten operation, and a fully connected operation.

16. A processor-implemented neural network operation method, comprising:
performing, based on a feature map corresponding to an image including an object, a first neural network operation including either one or both of a convolution operation and an activation operation;
performing selective normalization on an output of the first neural network operation by referring to a normalization parameter determined based on a selected partial area of the feature map, including selectively normalizing a portion of the output corresponding to an area including the object and selectively excluding from normalization a portion of the output corresponding to an area excluding the object depending on a value of the normalization parameter; and
generating an image classification result by performing one or more second neural network operations on the normalized output,
wherein the normalizing of the portion of the output corresponding to the area including the object is based on a parameter value determined for performing normalization, and the excluding from normalization of the portion of the output corresponding to an area excluding the object is based on a parameter value for skipping normalization.

* * * * *